United States Patent
Joachimsthaler et al.

(10) Patent No.: US 12,098,919 B2
(45) Date of Patent: Sep. 24, 2024

(54) DEVICE AND METHOD FOR DETERMINING A CONTACT BETWEEN A TOOL AND A WORKPIECE

(71) Applicant: DR. JOHANNES HEIDENHAIN GmbH, Traunreut (DE)

(72) Inventors: Ingo Joachimsthaler, Traunstein (DE); Sebastian Schmidt, Burghausen (DE); Johann Mitterreiter, Chieming (DE); Robert Metzke, Traunstein (DE); Christian Rebelein, Traunstein (DE); Alois Bartlechner, Palling (DE); Sebastian Gruber, Palling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 303 days.

(21) Appl. No.: 17/890,670

(22) Filed: Aug. 18, 2022

(65) Prior Publication Data
US 2023/0054355 A1 Feb. 23, 2023

(30) Foreign Application Priority Data
Aug. 18, 2021 (DE) .......................... 102021209049.4

(51) Int. Cl.
G01B 7/30 (2006.01)
B23Q 17/22 (2006.01)
G05B 19/401 (2006.01)

(52) U.S. Cl.
CPC ........... *G01B 7/30* (2013.01); *B23Q 17/2241* (2013.01); *G05B 19/401* (2013.01);
(Continued)

(58) Field of Classification Search
None
See application file for complete search history.

(56) References Cited

U.S. PATENT DOCUMENTS 10,105,809 B2 * 10/2018 Kluft .................. G05B 19/4065
11,020,831 B2 * 6/2021 Huber ...................... B23Q 1/70
2020/0012256 A1 * 1/2020 Mitterreiter .............. G01D 5/12

FOREIGN PATENT DOCUMENTS

DE  102014204833 A1  9/2015
EP      3501730 A1  6/2019
EP      3591344 A1  1/2020

OTHER PUBLICATIONS

European Search Report issued in corresponding EP Patent Application No. 22174033, dated Nov. 8, 2022, pp. 1-2.

* cited by examiner

*Primary Examiner* — Raymond L Nimox
(74) *Attorney, Agent, or Firm* — Carter, DeLuca & Farrell LLP

(57) ABSTRACT

In a device and method for determining a contact between a tool and a workpiece, which are displaceable relative to each other, the tool or workpiece being rotationally fixedly connected to a shaft, the device includes a measuring arrangement including a measuring scale rotationally fixedly disposed on the shaft and at least one position encoder disposed in a stationary manner relative to the shaft, and a processing device. The position encoder is adapted to scan the measuring scale and to generate position values indicating a position of the shaft. The position values are fed to the processing device, which determines contact between the tool and the workpiece by evaluating a progression of the position values and signals the result of the evaluation by the status of a displacement signal.

18 Claims, 13 Drawing Sheets

(52) U.S. Cl.
CPC .................... *B23Q 2717/00* (2013.01); *G05B 2219/33002* (2013.01); *G05B 2219/37411* (2013.01)

DEVICE AND METHOD FOR DETERMINING A CONTACT BETWEEN A TOOL AND A WORKPIECE

CROSS-REFERENCE TO RELATED APPLICATIONS

The present application claims priority to Application No. 10 2021 209 049.4, filed in the Federal Republic of Germany on Aug. 18, 2021, which is expressly incorporated herein in its entirety by reference thereto.

FIELD OF THE INVENTION

The present invention relates to a device and method for determining a contact between a tool and a workpiece in a machine tool. The device may be used, for example, in numerically controlled machine tools forming workpieces by machining, e.g., by milling, turning, grinding, etc.

BACKGROUND INFORMATION

Certain manufacturing methods for mechanical workpieces are based on machining, e.g., machining of materials. For example, material is removed from a blank, using tools in a specified manner, so that ultimately a product having the desired shape and function is produced. In order to remove material, the workpiece is brought into contact with a tool. The tools have geometrically definite or indefinite cutting edges. Examples of tools having geometrically definite cutting edges are mills, drills, or turning tools, and a tool having indefinite cutting edges is a grinding wheel. One of the objects—tool or workpiece—is typically caused to rotate for the cutting process before being brought into contact with the other object.

The machining is controlled by a computer while running a production program for actuating electrical drives in order to displace at least one of the objects. Position measuring devices—rotary encoders or distance measuring devices—are provided for determining the actual position of the displaced object and the measured values thereof are in turn fed to the computer. The computer is referred to as a CNC controller, and the machine tool for performing the machining is referred to as a CNC machine.

A spindle is provided for producing the rotation of the object. The spindle is an electric motor for driving—directly or indirectly—a shaft on which the object is mounted. A rotary encoder is provided for measuring the angle of rotation and/or the rotary speed of the spindle. Measuring devices may be provided for measuring the displacement of the shaft from an ideal location. European Patent Document No. 3 591 344 describes such a measuring device.

Clamping devices are provided for fixing the workpiece in place for the purpose of machining. Since the clamping of a new workpiece (blank) is subject to large tolerances and the dimensions of the blanks can also fluctuate, the exact position of the newly clamped blank and its dimensions must be determined at the beginning of machining. For this purpose, probes are used and are displaced in the direction of the workpiece instead of a tool, outputting a switch signal when the probe makes contact with the workpiece. The CNC controller evaluates the switch signal and determines the position and dimensions of the workpiece by traveling to, and contacting, a plurality of positions on the blank. Only then can the actual machining begin.

One disadvantage of the foregoing methodology is the amount of time associated therewith, because the tool must first be swapped with the probe and then swapped back again after the measuring procedure. A further disadvantage is that the surfaces of blanks often still have residual slag, particularly when cast components are used as blanks. These residues cannot be distinguished from the actual (metal) surface by a probe, so that a measurement error occurs. This leads, for example, to less material than desired being removed in the first machining steps, in turn extending the overall machining time (the potential machining depth is limited only by the metal and not by the slag).

SUMMARY

Example embodiments of the present invention provide a device and method by which the location of a workpiece in a machine tool can be determined.

According to an example embodiment of the present invention, a device for determining a contact between a tool and a workpiece in a machine tool, in which the tool and the workpiece are displaceable relative to each other, and in which the tool or the workpiece is rotationally fixedly connected to a shaft, includes a measuring arrangement having a measuring scale rotationally fixedly disposed on the shaft and at least one position encoder disposed in a stationary manner with respect to the shaft, and a processing device. The position encoder is adapted to scan the measuring scale and generate position values from the measuring scale for indicating a position of the shaft. The position values are fed to the processing device, which is adapted to determine a contact between the tool and the workpiece by evaluating a progression of position values and to signal the result of the evaluation by the status of a displacement signal.

According to an example embodiment of the present invention, a method for determining a contact between a tool and a workpiece in a machine tool, in which the tool and the workpiece are displaceable relative to each other, and in which the tool or the workpiece is rotationally fixedly connected to a shaft, by a device that includes a measuring arrangement having a measuring scale rotationally fixedly disposed on the shaft and at least one position encoder disposed in a stationary manner with respect to the shaft, and a processing device, includes: scanning the measuring scale by the position encoder and generating position values for indicating a position of the shaft; feeding the position values to the processing device; and determining, by the processing device, a contact between the tool and the workpiece by evaluating a progression of position values and signaling the result of the evaluation by the status of a displacement signal.

The measuring scale may include a scale track having code elements disposed in the circumferential direction of the shaft, and position values indicating the angular position of the shaft can be measured by the position encoder by scanning the code elements. For example, three position encoders are provided for scanning the scale track and are disposed at suitable spacing in the circumferential direction of the shaft, for example, at an angular spacing of 120°. Deflecting the shaft thus influences, depending on the direction of deflecting, the angular position measured by the position encoders and takes effect as a change in the angular difference determined by the arrangement of the position encoders. The magnitude and direction of the deflection of the shaft can, in turn, be derived therefrom.

In addition to the scale track, the measuring scale may include a second scale track having code elements disposed annularly about the circumference of the shaft. Three position encoders may be provided for scanning the second scale track, also disposed at suitable spacing in the circumferential direction of the shaft, again, for example, at a spacing of 120°. Scanning the second measuring scale may be used for measuring deflection of the shaft in the axial direction thereof. In this manner, rotating of the axis in the axial direction, that is, tilting of the axis relative to a resting position of the shaft, may be measured and takes effect as a tilting of the annular code elements relative to the position encoders.

The position values of the position encoders are fed to a displacement calculator in the processing device for continuously generating a displacement value as a measure for the deflection of the shaft induced by a force acting on the shaft. The processing device is configured to evaluate the progression of the displacement values.

For example, the processing device may include a threshold value determiner adapted to determine a threshold value of the incoming displacement values when idling and without contact between the tool and workpiece, and a comparator for comparing the threshold value with the currently incoming displacement values. The threshold value determiner can thereby be implemented for forming a threshold value each time the method begins, or for continuously forming new threshold values so that the influence of a drift of the displacement values is reduced. In a simplified form, the threshold value determiner merely provides a threshold value determined and saved beforehand.

As another example, the processing device may include a differentiator adapted to form differential quotients from successive arriving displacement values and the time interval of arrival thereof, and a comparator for comparing the differential quotients with previously saved threshold values.

Moreover, the processing device may include a frequency analyzer for evaluating the progression of the displacement values in the frequency range. By specifically evaluating the spectral power density of individual frequency bands determined by the rotary speed of the shaft and the quantity of cutting edges of the tool, contact between the tool and workpiece can be deduced.

The position values of at least one position encoder may also be directly fed to the frequency analyzer, so that the displacement calculator can be eliminated.

The processing device may include an AI module for evaluating the progression of the displacement values using artificial intelligence methods, e.g., by pattern recognition. This is particularly beneficial if the displacement values include large statistical variations.

It may be provided that the position values of at least one position encoder are fed directly to the AI module, so that no displacement calculator is necessary.

In order to provide interaction between the processing device and other components, such as a control device of the machine tool, the processing device may include a command channel by which commands and optionally parameters can be fed to the processing device. A command is, for example, a start command for starting the method. Parameters may include data defining the boundary conditions for evaluating the position values in the processing device, e.g., the rotary speed of the shaft, information about the tool (type, diameter, quantity of cutting edges), etc.

The command channel, together with the response data channel, may be implemented as a digital, e.g., serial, interface.

Further features and aspects of example embodiments of the present invention are described in more detail below with reference to the appended schematic Figures.

DETAILED DESCRIPTION

Figure 1:
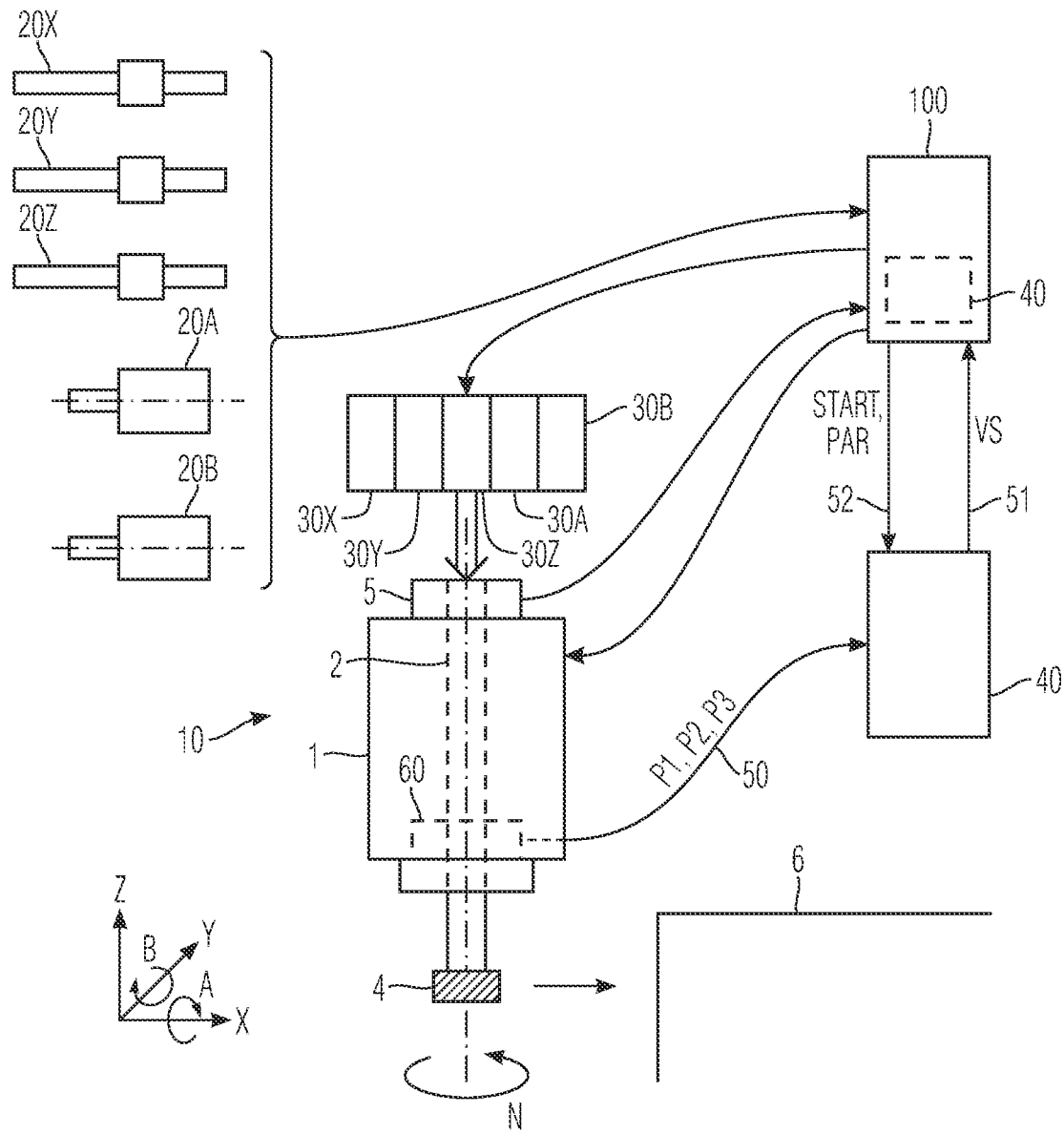
FIG. 1 illustrates a device according to an example embodiment of the present invention together with components of a machine tool.

FIG. 1 illustrates a device according to an example embodiment of the present invention together with components of a machine tool, e.g., a 5-axis milling machine. The machine tool includes a motor spindle 10, a drive, and a position measuring device for each axis of motion. A control device 100 is provided for controlling motion sequences, e.g., for machining a workpiece 6.

The central component of the motor spindle 10 is a spindle motor 1 having a shaft 2. A tool 4 (for example, a mill) is rotationally fixedly attached to one end of the shaft 2, so that the tool rotates with the shaft 2. A tool holder is provided for attaching the tool 4 to the shaft 2, e.g., a hollow shaft taper. An angle measuring device 5 (e.g., a rotary encoder) is also mechanically coupled to the shaft 2. The coupling is provided by a mechanical coupling connecting a rotating shaft of the angle measuring device 5 to the shaft 2. In this manner, the angular position and/or number of revolutions performed by the shaft 2 can be measured by the angle measuring device 5. The shaft 2 of the spindle motor 1 is supported in the housing by roller bearings, for example.

For machining the workpiece 6, the shaft 2 of the spindle motor 1 is caused to rotate and rotates at a rotary speed N. The angular position measured by the angle measuring device 5 serves for regulating the rotary speed. The tool 4 is brought into contact with the workpiece 6 by displacing the motor spindle 10 relative to the workpiece 6. For milling, for example, the desired contour is thus milled out of the workpiece 6. The relative motion can take place along linear drive axes X, Y, Z, and so-called pivot axes A, B can additionally be provided, so that a motion in five axes X, Y, Z, A, B is possible in the example illustrated. The motion of the individual axes is controlled by drives 30X, 30Y, 30Z, 30A, 30B (schematically illustrated), in turn driven by corresponding mechanical components. Further position measuring devices 20X, 20Y, 20Z, 20A, 20B are provided in the machine tool for determining the position of each of the motion axes X, Y, Z, A, B.

The motion of the axes includes relative motions, so that it is analogous to consider whether a drive displaces the motor spindle 10 and thus the tool 4, or displaces the workpiece 6.

Example embodiments of the present invention can also be used for machine tools, in which the workpiece, not the tool, is rotationally fixedly connected to the shaft and rotates together with the shaft. Typical examples include lathes, grinding machines, etc.

A control device 100 performs the controlling of such a machine tool according to a program. The control device 100 includes a computer having a suitable operating system on which corresponding programs are executed. The computer includes peripheral devices, such as a monitor, input devices, memory, etc. The control device 100 may be arranged as a numerical controller.

Measured values from the position measuring devices 20X, 20Y, 20Z, 20A, 20B and the angle measuring device 5 are fed to the control device 100 by suitable signal transmitting channels. Suitable signal transmitting channels are also provided for controlling the drives 30X, 30Y, 30Z, 30A, 30B and the spindle motor 1 by the control device 100. The signal transmitting channels may be adapted to transmit analog and/or digital signals, as required. For example, the signal transmitting channels may include digital data interfaces, e.g., serial data interfaces.

The machine tool includes the device hereof, including a processing device 40 and a measuring arrangement 60.

The measuring arrangement 60 is adapted to determine displacements (e.g., deflections) of the shaft 2. The arrangement is disposed on the shaft 2. Position values may be generated by the measuring arrangement 60 by scanning at least one measuring scale disposed about the circumference of the shaft 2 and rotating with the shaft 2, by at least one position encoder disposed in a stationary manner relative to the shaft 2, for indicating a position of the shaft 2. Displacements of the shaft 2 cause changes to the position values, so that by analyzing the generated position values, deductions can be made about the displacement of the shaft 2.

Because the effect of a deflection of the shaft 2 on the position values depends on the direction from which a force acts on the shaft, suitable configurations of the measuring arrangement 60 result if a plurality of position encoders are present, e.g., two or three position encoders disposed offset in the circumferential direction of the shaft 2. If two position encoders are present, the encoders are, for example, disposed at an angular spacing of 180°, and for three position encoders, a uniform distribution about the circumference of the shaft, that is, an angular spacing of 120° between each of the position encoders, may be provided.

The measuring arrangement 60 may be arranged as described in European Patent Document No. 3 591 344 and U.S. Patent Application Publication No. 2020/0012256, each of which is expressly incorporated herein in its entirety by reference thereto.

For example, three position encoders are provided. Suitable measuring arrangements 60 are further described in detail in conjunction with FIGS. 2 and 3.

The position values P1, P2, P3 of the measuring arrangement 60 generated by the three position encoders are fed to the processing device 40 for evaluation by a signal transfer channel 50. Position values refer, for example, to any type of signal representing a position of the shaft 2. Position values may thus be analog and/or digital signals. The position values are processed digitally in the processing device 40. Where the digitalization or conversion into digital data words takes place (in the position encoders immediately, or later in the processing device) is immaterial. The position values P1, P2, P3 may be transferred to the processing device in analog and/or digital form. The position encoders may immediately generate position values P1, P2, P3, and digital data words may be transferred by digital interfaces, e.g., serial interfaces.

The processing device 40 may be configured to determine contact between the tool 4 and workpiece 6 by evaluating the progression of the position values P1, P2, P3 arriving from the measuring arrangement 60. The results of the evaluation are signaled by the status of a displacement signal VS output by an output data channel 51 to the control device 100. The output data channel 51 may be a simple signal line by which the status of the displacement signal VS is output in the form of a voltage level. The output data channel 51 may also, however, be implemented as a digital data interface by which the status of the displacement signal VS is output as a data word or part of a data word.

The processing device 40 may be controlled, for example, by commands arriving via a command channel 52 from an external unit, e.g., from the control device 100. For example, the processing device 40 may be started by a start command START. It may also be provided that information (parameters PAR) required by the processing device for evaluating the position values P1, P2, P3 is fed to the processing device 40 by the command channel 52, for example, the rotary speed of the shaft 2, the feed speed of the motor spindle 10, information about the tool 2 (type, diameter, quantity of cutting edges, etc.), etc.

The processing device 40 may be an independent device, as shown, or may also be implemented as a module disposed within the control device 100 (as indicated by dashed lines). Functional modules for performing the functions of the processing device 40 may be implemented partially or entirely by a computer program, for example, for running on a computer (PC) of the control device 100 or by the processing device 40 itself. The same applies to the variations described herein. The output data channel 51 and the command channel 52 may be implemented jointly as a bidirectional interface, e.g., as a serial interface.

Figure 2:
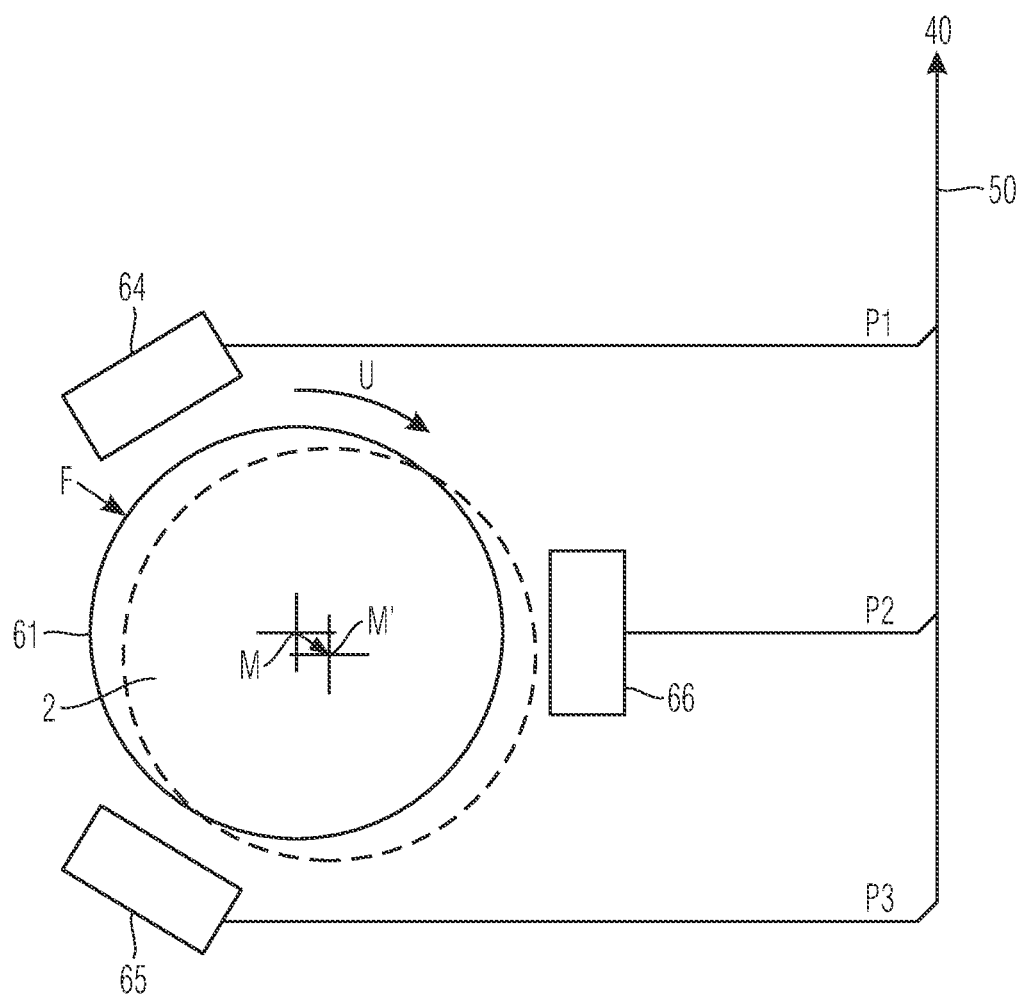
FIG. 2 illustrates a measuring arrangement.

FIG. 2 illustrates an example of a measuring arrangement 60, which including a measuring scale 61 having at least one scale track, and three position encoders 64, 65, 66.

The measuring scale 61 is rotationally fixedly disposed on the shaft 2 and rotates with the shaft 2. Code elements forming the measuring scale 61 can thereby be disposed directly on the shaft 2, for example, by magnetization, when a magnetic scanning principle is used, or by forming reflecting and non-reflecting regions for an optical scanning principle. The measuring scale 61 may alternatively be disposed on a scale carrier, which is rotationally fixedly connected to the shaft 2.

Figure 3:
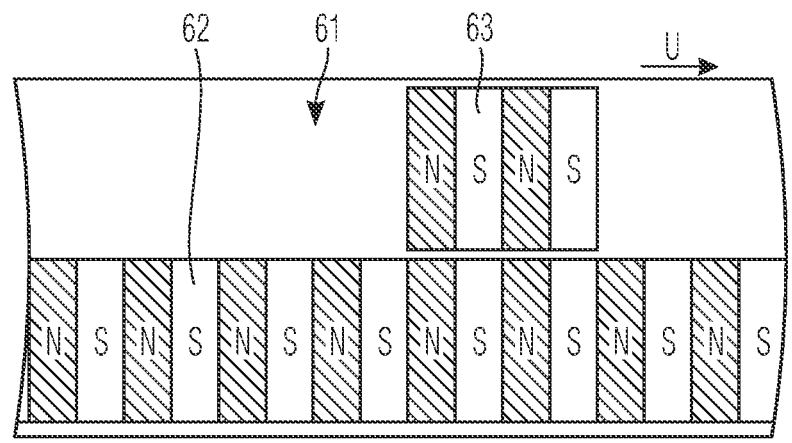
FIG. 3 illustrates a measuring scale suitable for the measuring arrangement illustrated in FIG. 2.

FIG. 3 illustrates a measuring scale 61 having a scale track 62. The code elements of the scale track 62 are disposed one after the other in the circumferential direction U of the shaft 2. In the illustrated example, the scale track 62 is implemented as an incremental scale track and, for example, is based on a magnetic scanning principle, e.g., the scale track is made of a regular sequence of magnetic positive and negative poles disposed in the circumferential direction U of the shaft 2. The measuring scale 61 may additionally include a reference track 63 by which a reference position for the relative angle measurement of the incremental scale track is defined by a short sequence of magnetic positive and negative poles (e.g., a reference mark) at a defined angle position. In this manner, an absolute angle measurement is made possible. The reference mark may also alternatively be integrated in the scale track 62.

The scale track 62 may also be digitally coded, so that an absolute angle measurement is possible at all times, even without a reference track 63. The code elements of the scale track 62 may be arranged in the form of a sequential pseudorandom sequence (Pseudo Random Code, PRC).

In the example illustrated in FIG. 2, the position encoders 64, 65, 66 are disposed at regular angular increments in the circumferential direction of the shaft 2, e.g., at an angular spacing of 120°. The position encoders 64, 65, 66 are disposed in a stationary manner relative to the shaft 2, so that the measuring scale 61 passes by the position encoders 64, 65, 66 when the shaft 2 rotates. By scanning the measuring scale 61 by the position encoders 64, 65, 66, the angle position of the shaft 2 can thus be measured. When a force F acts on the shaft 2, the shaft 2 is deflected, e.g., the center of rotation M is displaced (as illustrated in FIG. 2, the displaced center of rotation is referenced as M'). As indicated by the dashed circle, the measuring scale 61 is also displaced with the shaft 2 relative to the position encoder 64, 65, 66. This affects the angle measurement of the position encoder 64, 65, 66, so that by evaluating the progression of the position values P1, P2, P3 of individual position encoders 64, 65, 66 and/or the change in the angle difference between the position values P1, P2, P3 of the position encoders 64, 65, 66, deductions may be made about the magnitude and optionally the direction of the force F acting on the shaft 2.

The position values P1, P2, P3 generated by the position encoders 64, 65, 66 together with the measured angle position may be fed to the processing device 40 for evaluation via the signal transfer channel 50.

Figure 4:
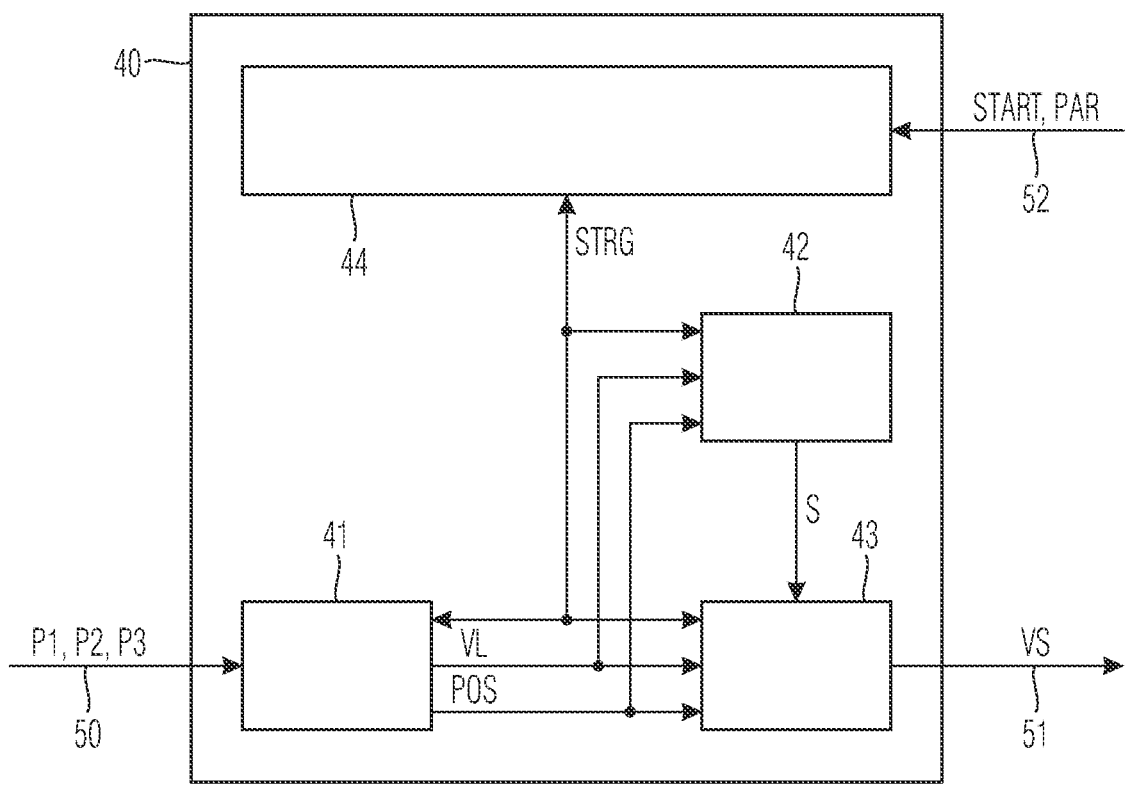
FIG. 4 illustrates a processing device of the device.

FIG. 4 illustrates an arrangement of processing device 40. The processing device 40 includes a displacement calculator 41, a threshold value determiner 42, a comparator 43, and a sequential controller 44.

The displacement calculator 41 is adapted to continuously determine displacement values VL from the incoming position values P1, P2, P3 at constant time intervals during operation, the displacement values indicating the magnitude of the deflection of the shaft 2 from a resting position, and to output the displacement values to the threshold value determiner 42 and to the comparator 43. The time intervals are selected so that at least one displacement value VL is generated for each revolution of the shaft 2.

Generating the displacement values VL may, as indicated above, be based on evaluating the progression of individual position values P1, P2, P3, or/and evaluating the difference of the position values P1, P2, P3 of a plurality of position encoders 64, 65, 66.

The displacement calculator 41 may optionally additionally calculate an angle position POS from the position values P1, P2, P3 and output the angle position POS to the threshold value determiner 42 and/or to the comparator 43, so that the direction of the deflection of the shaft 2 can be evaluated in addition to the magnitude. It may also be provided that the angle position POS is output to the control device 100 via the output data channel 51, so that the angle measuring device 5 may be eliminated, for example.

The threshold value determiner 42 determines a threshold value S for feeding to the comparator 43 at idle, e.g., when the shaft 2 is rotating and there is no contact between the tool 4 and the workpiece 6, from the displacement values VL captured during at least one complete revolution of the shaft 2. The threshold value S is determined so that a comparison with currently arriving displacement values VL provides for determining whether the motor spindle 10 is still idling (e.g., no contact between tool 4 and workpiece 6) or not.

Determining the threshold value S may be performed by calculating an average of the displacement values VL captured during at least one, e.g., a plurality of, complete revolutions of the shaft 2, and subsequently multiplying by a safety factor or adding a constant. A maximum value determined from a plurality of displacement values VL may alternatively be used as the threshold value S and is also multiplied by a safety factor or has a constant added thereto. The safety factor or the constant is selected in each case such that the resulting threshold value S is not exceeded even in case of statistical variations in the displacement values VL while idling.

The comparator 43 forms a displacement signal VS by comparing the displacement values VL arriving from the displacement calculator 41 with the threshold value S, the status of the signal indicating whether the threshold value S has been exceeded and outputting the displacement signal VS to the control device 100 via the output data channel 51. The comparison may take place directly between the threshold value S and individually arriving displacement values VL, so that one single displacement value VL exceeding the threshold value S brings about a change in the status of the displacement signal VS. Alternatively, the comparison may also take place between the threshold value S and an average of a plurality of displacement values VL, e.g., an average of at least all of the displacement values VL determined within one revolution of the shaft 2.

The sequences in the processing device 40 are controlled by the sequential controller 44, the start signal START, and optionally parameters PAR being fed thereto by the command channel 52. Control signals STRG output to the functional modules (e.g., displacement calculator 41, threshold value determiner 42, comparator 43, etc.) are used for the controlling. The control signals STRG may also include feedback from the functional modules to the sequential controller 44. After the start signal START arrives, the sequential controller 44 initiates the following method steps: continuously determining displacement values VL from position values P1, P2, P3 at constant time intervals in the displacement calculator 41 and outputting the displacement values VL to the threshold value determiner 42 and the comparator 43; forming a threshold value S of the displacement of the shaft 2 in the threshold value determiner 42 from a plurality of successive displacement values VL, subsequent increasing by multiplying by a safety factor or adding a constant, and outputting the threshold value S to the comparator 43; and comparing displacement values VL arriving from the displacement calculator 41 with the threshold value S in the comparator 43 and signaling the result of the comparison by the status of the displacement signal VS.

The method is suitable for determining the initial contact of the tool 4, for example, a mill or a grinding wheel, depending on the type of machining, with the workpiece 6 to be machined and thus for determining the beginning of machining. To this end, the threshold value S is determined at a position at which it is certain that no contact exists between the tool 4 and workpiece 6. The tool 4 and workpiece 6 are subsequently brought close together by at least one drive until mechanical contact occurs. The method may be performed when the shaft 2 is rotating, because then the initial engagement of a cutting edge 4 in the workpiece 6 can be determined.

For example, the threshold value S is a constant value saved in the threshold value determiner 42. In this instance, the step of forming and outputting the threshold value S is reduced to transferring the saved threshold value S to the comparator 43 after the starting command START arrives. Switching on a supply voltage of the processing device 40 may also be interpreted as a starting command in place of the starting command START, for example.

Figure 5:
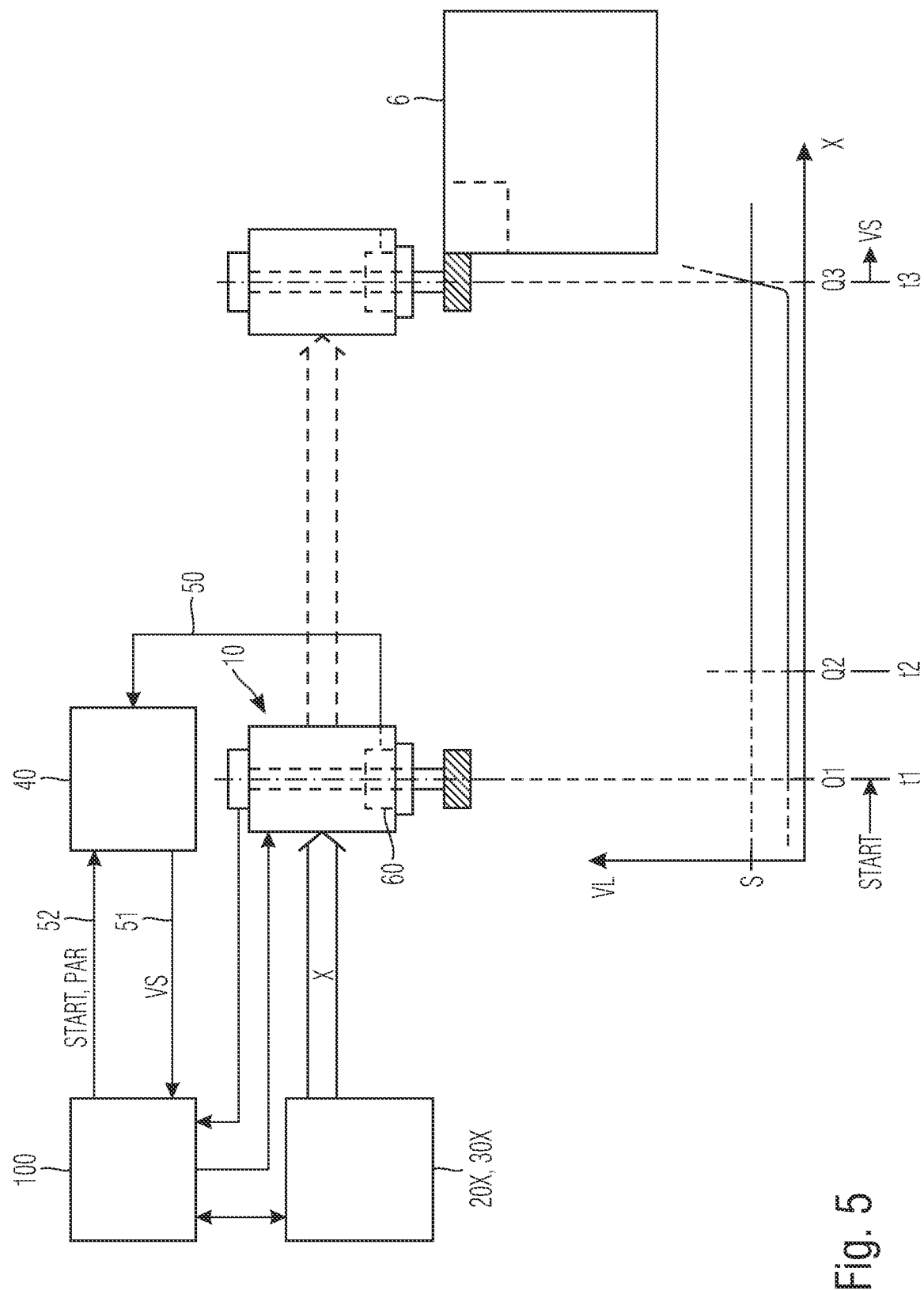
FIG. 5 illustrates the device together with a machine tool.

FIG. 5 illustrates the device described herein together with a machine tool. The machine tool includes, for example, a motor spindle 10, a drive 20X having a position measuring device 30X for measuring a position of the drive 20X in a direction of motion X, and a control device 100.

The machine tool further includes a measuring arrangement 60 and a processing device 40.

The drive 20X is adapted to displace the motor spindle 10 in the direction of motion X. For example, the drive 20X displaces the motor spindle 10 toward the workpiece 6 until the tool 4 makes contact with the workpiece 6. Due to the known geometry of the machine tool, the position of the tool 4 is also known due to the position of the drive 20X measured by the position measuring device 30X.

The motion of the drive 20X, the rotation of the shaft 2, and the interaction with the processing device 40 may be controlled by a computer program able to be executed by the control device 100.

As described above, the exact position of a new workpiece 6 to be machined and clamped fixedly in the working region of the motor spindle 10 by a clamping device is still unknown. Only the rough position and alignment of the workpiece as provided by the clamping means are known. Also known are the dimensions of the workpiece 6 (workpiece blank). Prior to machining the workpiece contour, it is necessary to determine the exact position of the workpiece 6. An exemplary method is described below with reference to the signal diagram illustrated in FIG. 5.

In the initial position, the motor spindle 10 is present at the position Q1. At a point in time t1, the control device 100 actuates the spindle motor 1, so that the motor rotates at the rotary speed N. The rotary speed is controlled by the angle measuring device 5 for measuring the angle position of the shaft 2. The control device 100 also signals the drive 20X to displace the motor spindle 10 in the direction of motion X toward the workpiece 6 and sends the start command START to the processing device 40.

The processing device 40 performs the method described with reference to FIG. 4, that is, the displacement calculator 41 continuously determines displacement values VL and the threshold value determiner 42 determines the threshold value S therefrom. At a point in time t2 at a position Q2, the threshold value S is available and the comparison between the threshold value S and the incoming displacement values VL takes place in the comparator 43. Contact occurs between the tool 4 and the workpiece 6 near a position Q3. In other words, a tool cutting edge engages in the material of the workpiece 6. The force F thus arising causes a steep rise in the progression of the displacement values VL, exceeding the threshold value S at the point in time t3 at the position Q3. This, in turn, is signaled by a change in status of the displacement signal VS.

When the status of the displacement signal VS signals the contact between the tool 4 and the workpiece 6, the control device 100 saves the current position value of the position measuring device 30X as the position of the workpiece 6 in the direction of motion X and stops the drive 20X, or reverses the direction of motion, so that the tool 4 and workpiece 6 are displaced away from each other. Alternatively, however, the control device 100 can transition directly to machining the workpiece 6 and optionally adapt the feed speed of the drive 20X or the rotary speed of the shaft 2 accordingly.

While only one direction of motion is described above, the foregoing is performed repeatedly in a plurality of directions of motion (e.g., five directions of motion, as illustrated in FIG. 1), until a sufficient number of contact points (e.g., workpiece coordinates) are available for determining the exact position of the workpiece 6 or the workpiece blank and for being able to begin the actual machining.

Because the described method is a material cutting method, the contact points between the tool 4 and the workpiece 6 may be selected so that the points are in regions to be removed later in any case when the workpiece 6 is machined (e.g., the final contour of the completely machined workpiece 6 is indicated by a dashed line in FIG. 5), or it is ensured by a defined oversize of the workpiece 6 that the final contour of the workpiece 6 is not impaired by the method described herein.

Even if the workpiece blank includes contaminants on the surface, such as slag residue, the contact between the tool 4 and the actual surface of the workpiece 6 can be detected by the method described herein, because the tool penetrates the contaminants without significantly deflecting the shaft 2.

Figure 6:
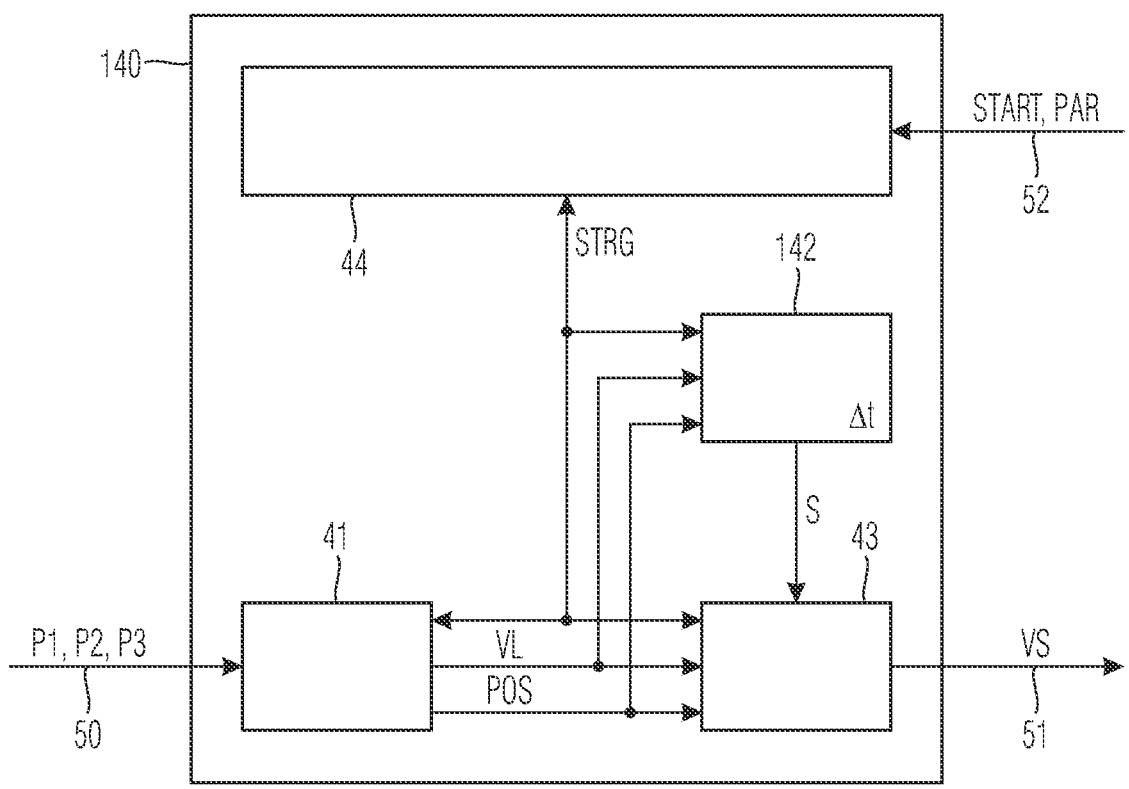
FIG. 6 illustrates a processing device of the device.

FIG. 6 illustrates a further example of a processing device 140. In comparison with the processing device 40, the threshold determiner 142 is implemented for continuously determining threshold values S at time intervals Δt during operation until contact between the tool 4 and workpiece 6 is determined and for feeding the threshold values S to the comparator 43. This is particularly beneficial when the position values P1, P2, P3 and the displacement values VL generated therefrom are subject to drift, e.g., the displacement values VL vary during idling when the shaft 2 rotates, even without contact between the tool 4 and workpiece 6. A cause for a drift can be a local, asymmetrical heating of the measuring arrangement 60, for example, so that the position encoders 64, 65, 66 change the positions thereof relative to each other due to thermal expansion effects, taking effect as a change in the position values P1, P2, P3. Thermal expansion effects can also influence the bearing of the shaft 2 and can displace the shaft 2 even without external force effects. Such effects can be neglected in many applications, but these effects can significantly increase the sensitivity and precision of the device described herein.

Figure 7:
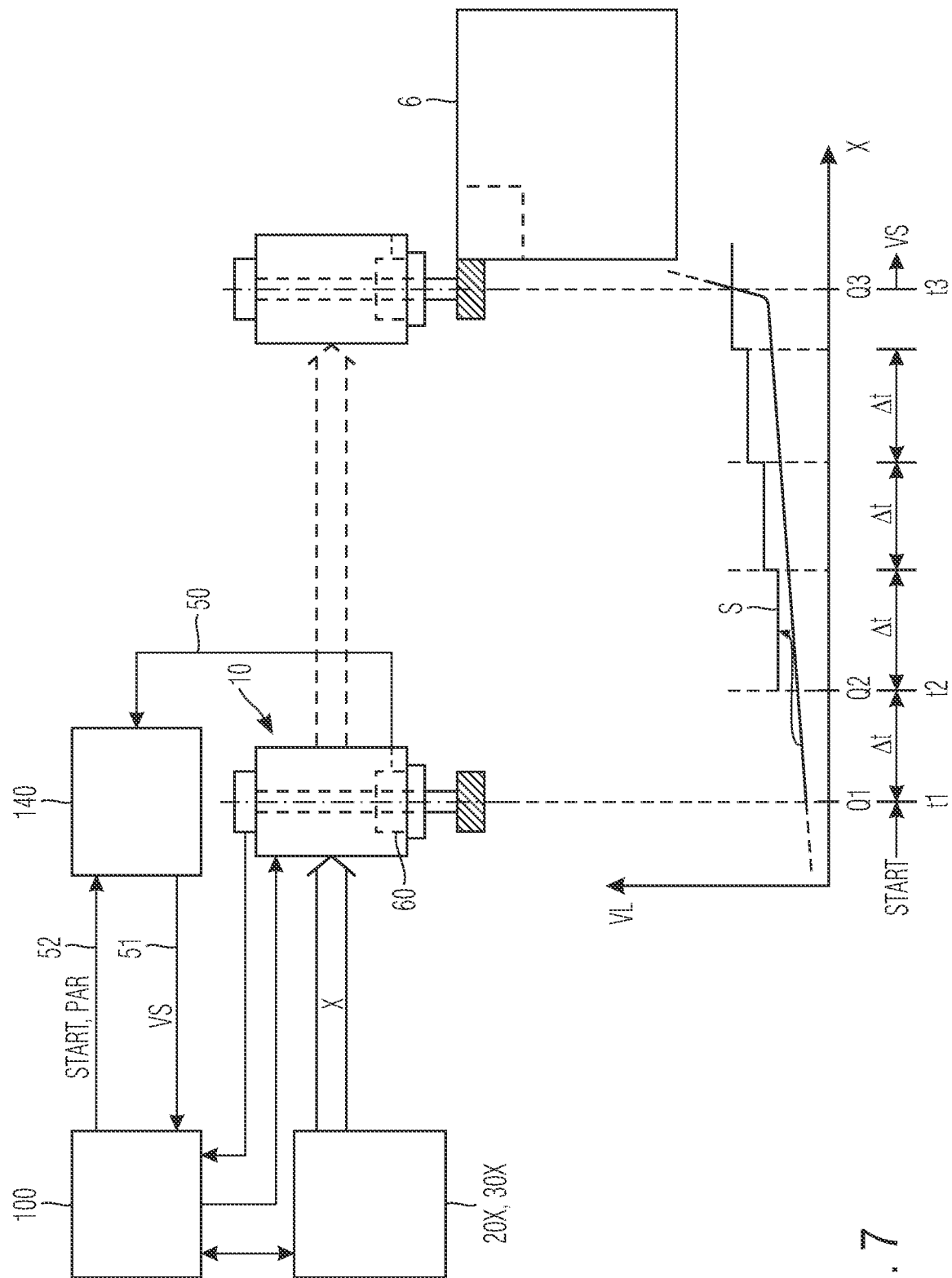
FIG. 7 illustrates the device together with a machine tool.

FIG. 7 illustrates a device according to an example embodiment of the present invention together with a machine tool and a processing device 140.

In the illustrates example embodiment, the displacement values VL are subject to drift, e.g., the progression of the displacement values VL shows a continuous rise even when idling, while the tool spindle 10 and the tool 4 are approaching the workpiece 6.

In the initial position, the motor spindle 10 is present at the position Q1. At a point in time t1, the control device 100 actuates the spindle motor 1, so that the motor rotates. The rotary speed is controlled by the angle measuring device 5 for measuring the angle position of the shaft 2. The control device 100 also signals the drive 20X to displace the motor spindle 10 in the direction of motion X toward the workpiece 6 and sends the start command START to the processing device 140.

The processing device 140 performs the method described in relation to FIG. 4, e.g., the displacement calculator 41 continuously determines displacement values VL and the threshold value determiner 142 determines the threshold value S therefrom. At a point in time t2 at a position Q2, the threshold value S is available and the comparison between the threshold value S and the incoming displacement values VL takes place in the comparator 43.

Deviating from the example embodiment described with respect to FIG. 5, the threshold value determiner 142 continuously determines the threshold value S again at time intervals Δt and outputs the updated threshold value S to the comparator 43. In this manner, the comparison always uses a threshold value S for which the drift of the displacement values VL is taken into consideration.

Contact occurs between the tool 4 and the workpiece 6 near a position Q3. In comparison with the rise of the progression of the displacement values VL caused by the drift, the force F thereby arising causes a substantially steeper rise in the progression of the displacement values VL, exceeding the threshold value S used at the present point in time at the point in time t3 at the position Q3. This leads to a change in the status of the displacement signal VS.

Figure 8:
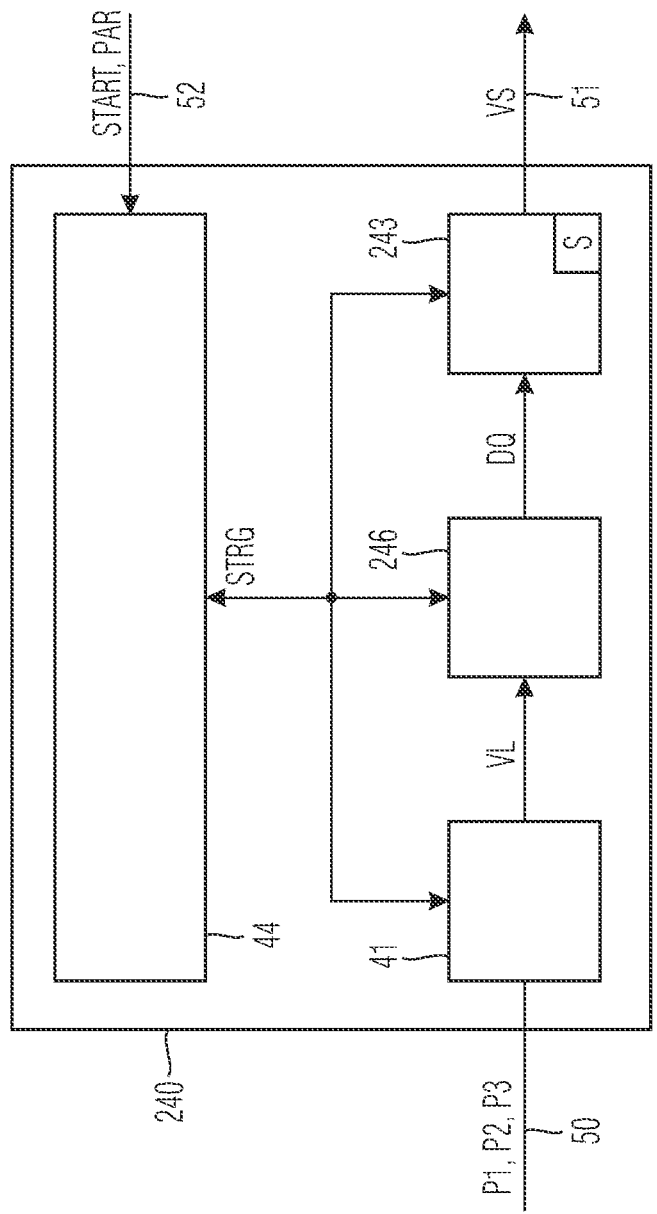
FIG. 8 illustrates a processing device of the device.

FIG. 8 illustrates a further example embodiment of a processing device 240, which further includes the displacement calculator 41 and the sequential controller 44. Deviating from the example embodiments described above, the processing device 240 includes a differentiator 246 for calculating the differential quotient DQ of successively arriving displacement values VL and the time spacing of the arrival thereof at the differentiator 246 and outputs the quotient to a comparator 243.

The comparator 243 compares incoming differential quotients DQ with a suitable threshold value S saved in the comparator 243 in a memory. When a differential quotient DQ exceeds the threshold value S, the comparator signals the same by the changed status of the displacement signal VS.

Figure 9:
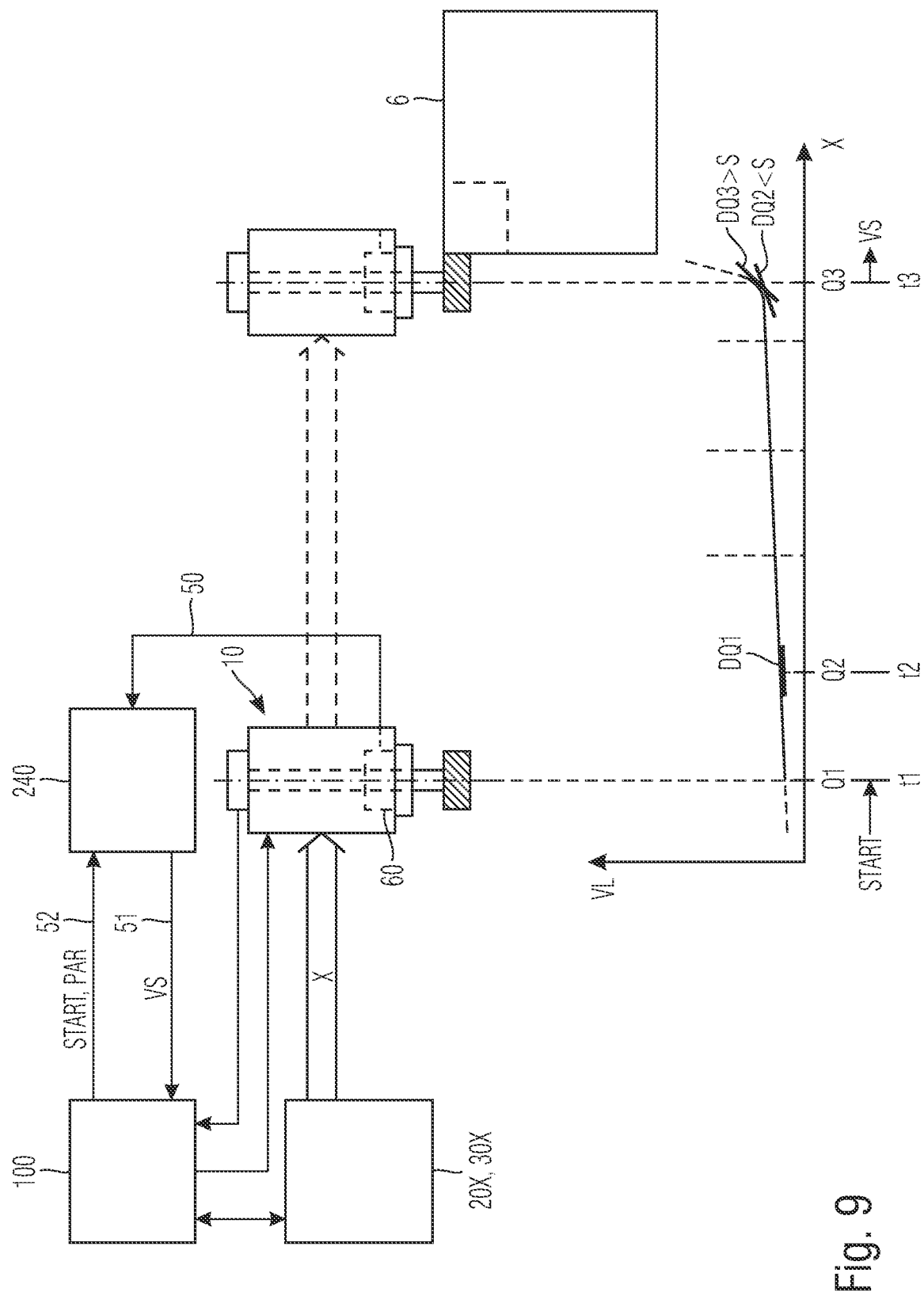
FIG. 9 illustrates the device together with a machine tool.

FIG. 9 illustrates a device according to an example embodiment of the present invention together with a machine tool and a processing device 240.

In the illustrated example embodiment example, the displacement values VL are subject to drift and the progression of the displacement values VL shows a continuous rise even when idling, while the tool spindle 10 and the tool 4 are approaching the workpiece 6.

At the position Q1 at the point in time t1, the start command START arrives at the processing device 240 and the control device 100 actuates the spindle motor 1, thus causing the spindle motor 1 to rotate. The control device 100 also signals the drive 20X to displace the motor spindle 10 in the direction of motion X toward the workpiece 6. The displacement calculator 41 thereupon begins to generate displacement values VL at constant time intervals and feeds the displacement values VL to the differentiator 246. The differentiator 246 continuously forms the differential quotients DQ for successively arriving displacement values VL and the time spacing of arrival thereof.

When idling, e.g., while the tool 4 is approaching the workpiece 6, for example, determined at the point in time t2 at the position Q2, the differential quotient DQ (at the position DQ1) is substantially constant.

When the tool 4 contacts the workpiece 6, the progression of the displacement values VL rises and thus the differential quotients DQ also rise. In the example illustrated, the differential quotient DQ2, calculated just before the position Q3, is still below the threshold value S. At the point in time t3 at the position Q3, the quotient exceeds the threshold value S and the comparator 243 changes the status of the displacement signal VS.

Figure 10:
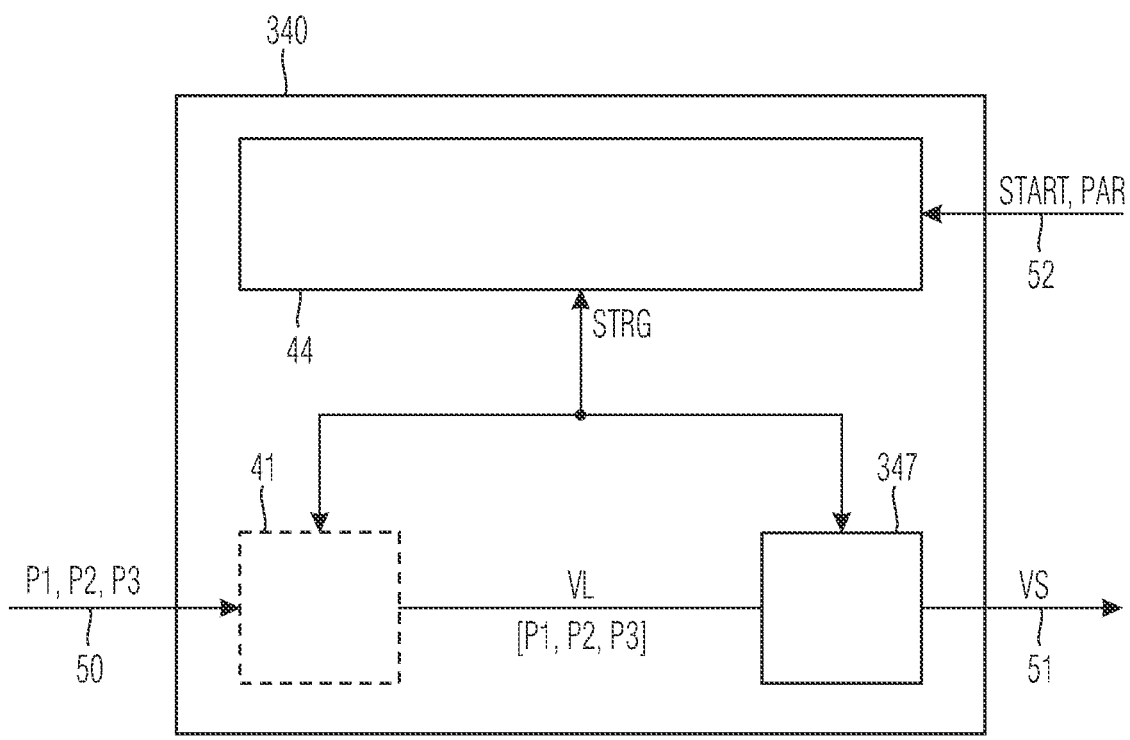
FIG. 10 illustrates a processing device of the device.

FIG. 10 illustrates a further example embodiment of a processing device 340, which includes a frequency analyzer 347 in addition to the displacement calculator 41 (optional in the present example) and the sequential controller 44. The frequency analyzer 347 is adapted to evaluate in the frequency range the progression of displacement values VL arriving from the displacement calculator 41. Mathematical methods such as Fourier analysis (FFT, DFT, Goertzel algorithm, etc.), order analysis, and adaptive filtering may be used.

Evaluating the displacement values VL in the frequency range is particularly beneficial when a tool having geometrically determined cutting edges, such as a mill, is used as the tool 4. When contact is made between the tool 4 and workpiece 6 while the shaft 2 is rotating, each cutting edge causes a significant deflection of the shaft 2 when engaging in the workpiece 6. By specifically evaluating the spectral power density of frequency bands depending on the rotary speed of the shaft 2 and the quantity of cutting edges of the tool 4, the contact between the tool 4 and the workpiece 6 may thus be determined. The result of the evaluation may be output by the status of the displacement signal VS.

The displacement calculator 41 may be optionally eliminated in the present example embodiment, so that the position values P1, P2, P3 are fed directly to the frequency analyzer 347. The method is based on the principle that when the shaft 2 is rotating in sequences of position values P1, P2, P3 of each individual position encoder 64, 65, 66 measured at identical time intervals, deflections of the shaft 2 take effect in the form of a variation of the position differential of successively measured position values. The variation of the position differential may be observed in the frequency spectrum.

Figure 11:
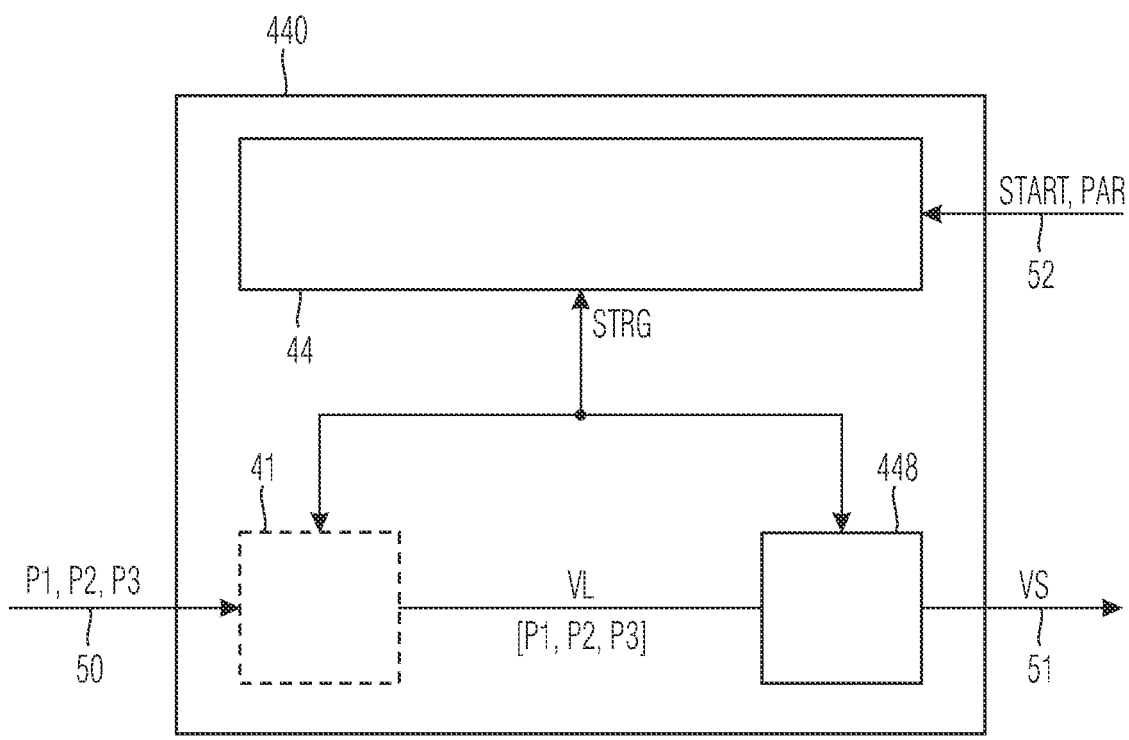
FIG. 11 illustrates a processing device of the device.

FIG. 11 illustrates a further example embodiment of a processing device 440, which includes an AI module 448 in addition to the (optional) displacement calculator 41 and the sequential controller 44.

The AI module is adapted to evaluate the progression of displacement values VL arriving from the displacement calculator 41 by methods of artificial intelligence, for example, by comparing with previously determined patterns (e.g., machine teaching) and thus detecting the contact between the tool 4 and workpiece 6. The AI module is, for example, self-teaching, so that the detecting of contact procedures is continuously improved.

According to certain example embodiments, the displacement calculator 41 may be eliminated, so that, as in the preceding example, the position values P1, P2, P3 are fed directly to the AI module 448 and the time sequence of the position values P1, P2, P3 is evaluated.

When the contact between the tool 4 and workpiece 6 is detected, the detection is indicated by the displacement signal VS.

Figure 12:
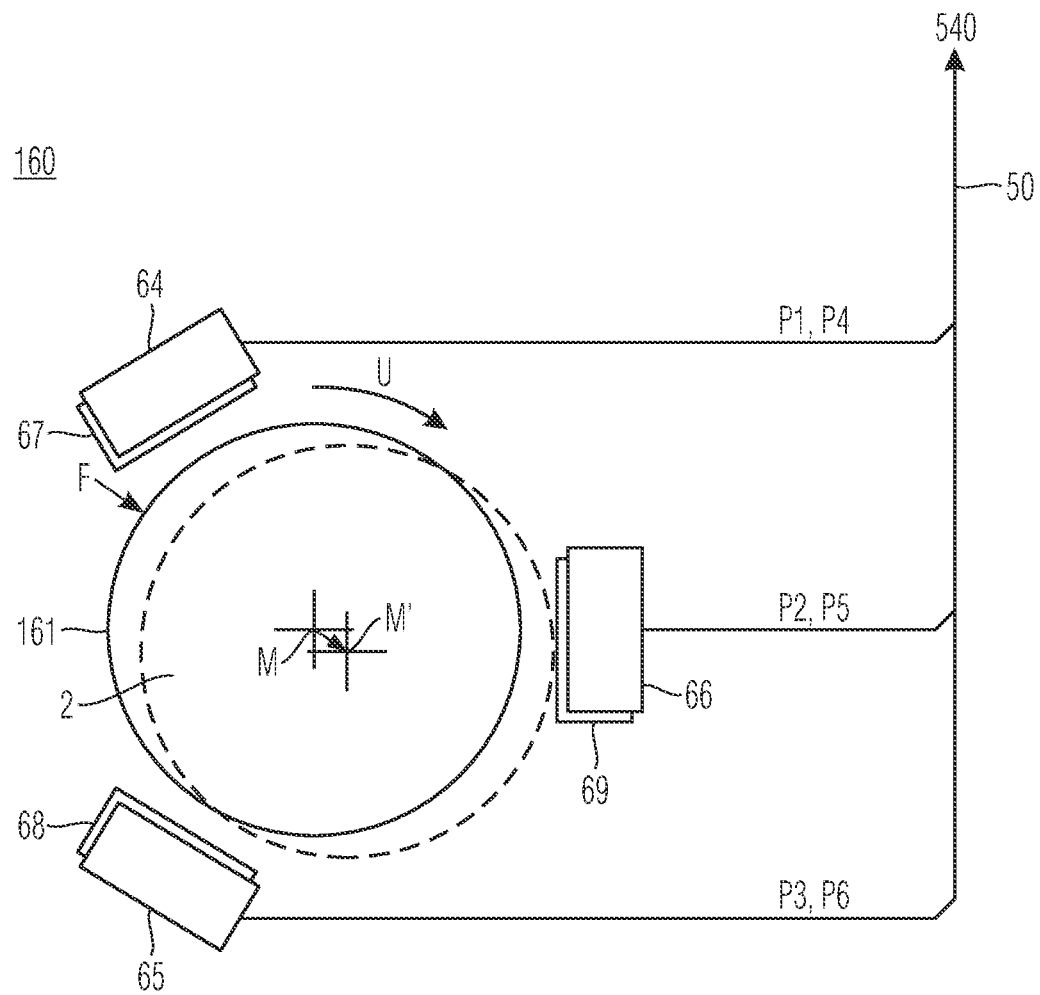
FIG. 12 illustrates a measuring arrangement.

FIG. 12 illustrates a further example embodiment of a measuring arrangement 160, which includes a measuring scale 161 and six position encoders 64 to 69.

The measuring scale 161 is rotationally fixedly disposed on the shaft 2 and rotates with the shaft 2.

Figure 13:
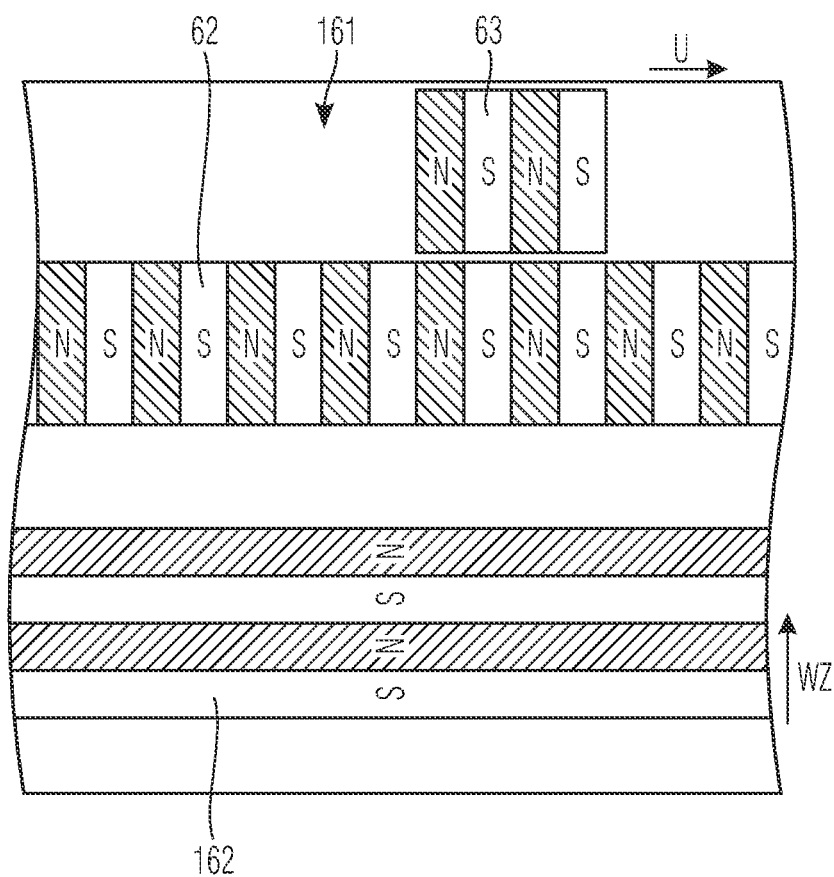
FIG. 13 illustrates a measuring scale for the measuring arrangement illustrated in FIG. 12.

FIG. 13 illustrates a measuring scale 161. Analogous to the measuring scale 61 illustrated in FIG. 3, the scale 161 includes a scale track 62 and optionally a reference track 63. In addition, the measuring scale 161 includes a second scale track 162 having code elements disposed annularly about the circumference of the shaft 2. The foregoing arrangement provides for measuring the displacement of the shaft 2 in the axial direction WZ thereof.

In the example embodiment illustrated in FIG. 12, further position encoders 67, 68, 69 are provided for scanning the second scale track 162 in addition to the position encoders 64, 65, 66 provided for scanning the scale track 62 and optionally the reference track 63. The encoders are also disposed at regular angle increments in the circumferential direction of the shaft 2, e.g., at an angular spacing of 120°.

When the force F brings about a tilting of the shaft 2, e.g., a rotation perpendicular to the axial direction, in addition to the displacement of the shaft 2 (and thus of the scale track 62) perpendicular to the axial direction (for measurement by the position encoders 64, 65, 66 by scanning the scale track 62), the tilting can be measured by the position encoders 67, 68, 69 by scanning the second scale track 162.

The arrangement of the position encoders 67, 68, 69 for scanning the second scale track 162 is considered to be particularly beneficial, because pure motions of the shaft 2 in the axial direction WZ and tilting of the shaft 2 can be clearly differentiated by evaluating the three position values P4, P5, P6, and thus can be evaluated separately from each other. If, for example, only motions (e.g., displacements) of the shaft 2 in the axial direction WZ are sensed, then one of the position encoders 67, 68, 69 disposed at an arbitrary location of the circumference is sufficient.

Instead of two separate scale tracks 62, 162, only one scale track may also be provided, the code elements thereof being implemented so that both measuring the angle position of the shaft 2 and measuring the displacement thereof in the axial direction WZ are possible. This is provided, for example, when the code elements of the scale track 62 are disposed in the form of a herringbone pattern. Complete detection of all displacement directions may also be performed by six position encoders 64 to 69 for such a scale track.

The position values P1 to P6 generated by the position encoders 64 to 69 may be fed to a processing device 540 by the signal transfer channel 50.

Figure 14:
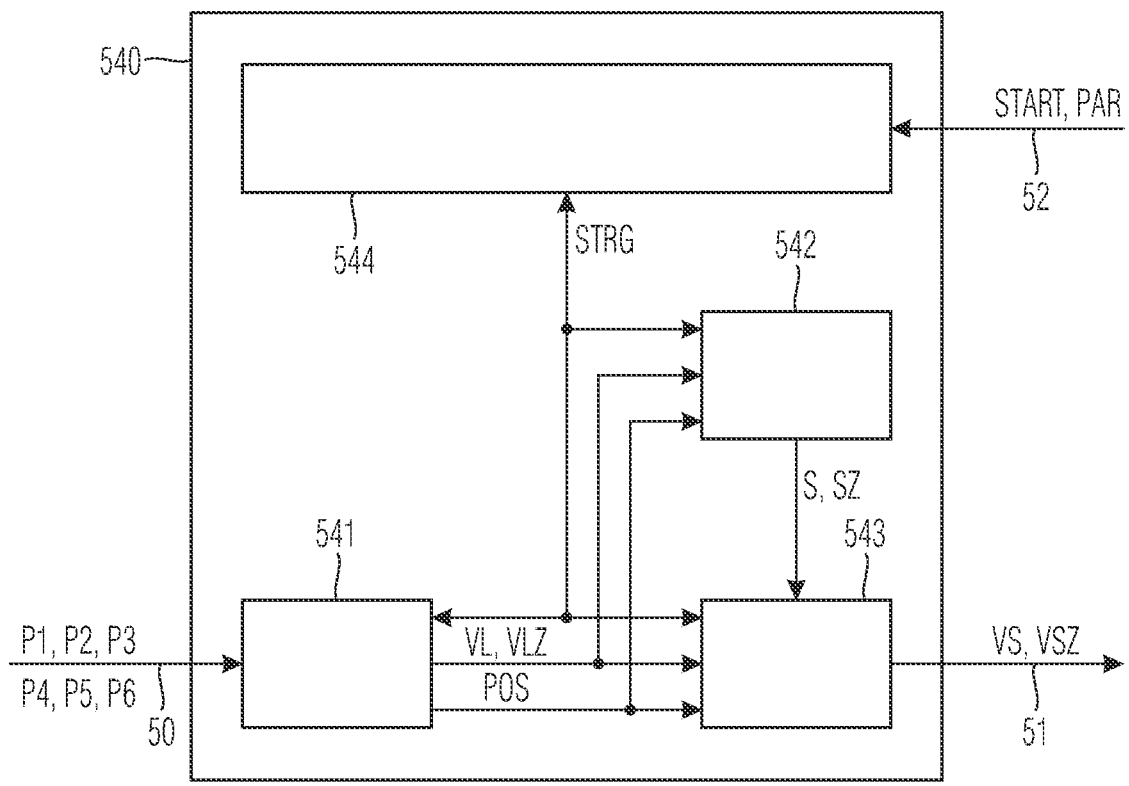
FIG. 14 illustrates a processing device of the device.

FIG. 14 illustrates a further example embodiment of a processing device 540. Analogous to the processing device 40 described in relation to FIG. 4, the processing device 540 includes a displacement calculator 541, a threshold value determiner 542, a comparator 543, and a sequential controller 544.

The displacement calculator 541 further determines displacement values VL at constant time intervals, indicating a deflection of the shaft 2 in a plane perpendicular to the axial direction. In addition, the displacement calculator 541 determines two displacement values VLZ, indicating a displacement of the shaft 2 in the axial direction WZ, based on the position values P4, P5, P6 resulting from the scanning of the second scale track 162 by the position encoders 67, 68, 69.

The threshold value determiner 542 determines a second threshold value SZ, based on the second displacement values VLZ, in addition to the threshold value S. The second threshold value SZ is determined so that the second threshold value SZ is not exceeded by currently arriving second displacement values VLZ while idling.

The threshold value S and the second threshold value SZ are fed to the comparator 543 for checking whether the shaft 2 is idling or not by comparing with currently arriving displacement values VL or second displacement values VLZ. The comparator 543 outputs the result of the comparisons by the displacement signal VS and a second displacement signal VSZ.

For example, any of the processing devices 140, 240, 340, 440 may be arranged to evaluate the position values P1, P2, P3, P4, P5, P6 of the measuring arrangement 160.

What is claimed is:

1. A device for determining a contact between a tool and a workpiece in a machine tool, the tool and the workpiece being displaceable relative to each other and the tool or the workpiece being rotationally fixedly connected to a shaft, comprising:
    a processing device; and
    a measuring device including a measuring scale rotationally fixedly disposed on the shaft and at least one position encoder disposed in a stationary manner with respect to the shaft, the position encoder adapted to scan the measuring scale and to generate position values from the scan of the measuring scale that indicate a position of the shaft, the measuring device adapted to feed the position values to the processing device;
    wherein the processing device is adapted to determine a contact between the tool and the workpiece by evaluating a progression of the position values and to signal a result of the evaluation by a status of a displacement signal.

2. The device according to claim 1, wherein the measuring scale includes a scale track having code elements arranged in a circumferential direction of the shaft.

3. The device according to claim 2, wherein the measuring scale includes a second scale track having code elements disposed annularly about a circumference of the shaft.

4. The device according to claim 1, wherein processing device includes a displacement calculator adapted to determine displacement values, from the position values, that indicate a deflection of the shaft from a rest position.

5. The device according to claim 4, wherein the processing device includes:
    a threshold value determiner adapted to determine a threshold value of incoming displacement values while idling and without contact between the tool and workpiece and a comparator adapted to compare the threshold value with currently arriving displacement values;
    a differentiator adapted to form differential quotients of successively arriving displacement values and a comparator adapted to compare the differential quotients with previously saved threshold values;
    a frequency analyzer adapted to evaluating a progression of the displacement values in a frequency range; and/or
    an AI module adapted to evaluate the progression of the displacement values by artificial intelligence methods and/or by pattern recognition.

6. The device according to claim 1, wherein the processing device includes a frequency analyzer adapted to evaluate the progression of the position values in a frequency range, and/or an AI module adapted to evaluate the progression of the position values by artificial intelligence methods and/or by pattern recognition.

7. The device according to claim 1, wherein the device is adapted to perform a method for determining the contact between the tool and the workpiece, including:
    scanning the measuring scale by the position encoder;
    generating the position values, from the scanning of the measuring scale, that indicate the position of the shaft;
    feeding the position values to the processing device;
    determining, by the processing device, the contact between the tool and the workpiece by evaluating the progression of the position values; and
    signaling the result of the evaluation by the status of the displacement signal.

8. A method for determining a contact between a tool and a workpiece in a machine tool, the tool and the workpiece being displaceable relative to each other, the tool or the workpiece being rotationally fixedly connected to a shaft, comprising:
    scanning a measuring scale by at least one position encoder, the measuring scale being rotationally fixedly disposed on the shaft and the position encoder being disposed in a stationary manner with respect to the shaft;

generating position values, from the scanning of the measuring scale, that indicate a position of the shaft;

feeding the position values to a processing device;

determining, by the processing device, a contact between the tool and the workpiece by evaluating a progression of the position values; and signaling a result of the evaluation by a status of a displacement signal.

9. The method according to claim 8, wherein the processing device includes a displacement calculator adapted to determine displacement values, from the position values, that indicate a deflection of the shaft from a rest position.

10. The method according to claim 8, further comprising determining, by a displacement calculator of the processing device, displacement values, from the position values, that indicate a deflection of the shaft from a rest position.

11. The method according to claim 8, wherein the processing device includes:
- a threshold value determiner adapted to determine a threshold value of incoming displacement values while idling and without contact between the tool and workpiece, and a comparator adapted to compare the threshold value with the currently arriving displacement values;
- a differentiator adapted to form differential quotients of successively arriving displacement values, and a comparator adapted to compare the differential quotients with previously saved threshold values;
- a frequency analyzer adapted to evaluate a progression of the displacement values in a frequency range; and/or
- an AI module adapted to evaluate the progression of the displacement values by artificial intelligence methods and/or by pattern recognition.

12. The method according to claim 8, further comprising:
- determining, by the processing device, a threshold value of incoming displacement values while idling and without contact between the tool and workpiece, and comparing the threshold value with the currently arriving displacement values;
- forming, by the processing device, differential quotients of successively arriving displacement values, and comparing the differential quotients with previously saved threshold values;
- evaluating, by the processing device, a progression of the displacement values in a frequency range; and/or
- evaluating, by the processing device, the progression of the displacement values by artificial intelligence methods and/or by pattern recognition.

13. The method according to claim 8, wherein the processing device includes:
- a frequency analyzer adapted to evaluate the progression of the position values in a frequency range; and/or
- an AI module adapted to evaluate the progression of the position values by artificial intelligence methods and/or by pattern recognition.

14. The method according to claim 8, further comprising:
- evaluating, by the processing device, the progression of the position values in a frequency range; and/or
- evaluating, by the processing device, the progression of the position values by artificial intelligence methods and/or by pattern recognition.

15. The method according to claim 8, wherein the method is started by a start command fed to the processing device via a command channel.

16. The method according to claim 8, wherein the method is performed while the shaft is rotating.

17. The method according to claim 8, wherein the method is performed by a device for determining the contact between the tool and the workpiece in the machine tool, the device including:
- the processing device; and
- a measuring device including the measuring scale rotationally fixedly disposed on the shaft and the position encoder, the position encoder adapted to scan the measuring scale and to generate the position values from the scan of the measuring scale that indicate the position of the shaft, the measuring device adapted to feed the position values to the processing device; and
- wherein the processing device is adapted to determine the contact between the tool and the workpiece by evaluating the progression of the position values and to signal the result of the evaluation by the status of a displacement signal.

18. A machine tool, comprising:
- a device adapted to determining a contact between a tool and a workpiece in the machine tool, the tool and the workpiece being displaceable relative to each other and the tool or the workpiece being rotationally fixedly connected to a shaft, the device including:
  - a processing device; and
  - a measuring device including a measuring scale rotationally fixedly disposed on the shaft and at least one position encoder disposed in a stationary manner with respect to the shaft, the position encoder adapted to scan the measuring scale and to generate position values from the scan of the measuring scale that indicate a position of the shaft, the measuring device adapted to feed the position values to the processing device;
- wherein the processing device is adapted to determine a contact between the tool and the workpiece by evaluating a progression of the position values and to signal a result of the evaluation by a status of a displacement signal.

* * * * *